UNITED STATES PATENT OFFICE 2,661,277

HERBICIDES

David T. Mowry and Arthur H. Schlesinger, Dayton, Ohio, assignors to Monsanto Chemical Company, St. Louis, Mo., a corporation of Delaware No Drawing. Application September 12, 1952, Serial No. 309,365

13 Claims. (Cl. 71—2.5)

The present invention provides new and highly valuable herbicidal compositions and methods of destroying or preventing plant growth in which said compositions are employed.

We have found that improved, very efficient herbicidal compositions, are obtained when there are prepared oil-in-water emulsions of quinoline derivatives having the formula

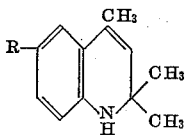

in which R is selected from the class consisting of alkyl and alkoxy radicals of from 1 to 5 carbon atoms. Compositions having the above formula include 6 - methoxy-2,2,4-trimethyl-1,2-dihydroquinoline, 6-ethoxy-2,2,4-trimethyl-1,2-dihydroquinoline, 6-isopropyl-2,2,4-trimethyl-1,2-dihydroquinoline, 6-butoxy-2,2,4-trimethyl-1,2-dihydroquinoline, 6-n-amyloxy-2,2,4-trimethyl-1,2-dihydroquinoline, 6-ethyl-2,2,4-trimethyl-1,2-dihydroquinoline, 6-n-propyl-2,2,4-trimethyl-1,2-dihydroquinoline, 6-tert.-amyl-2,2,4-trimethyl-1,2-dihydroquinoline, and 1,2-dihydro - 2,2,4,6-tetramethylquinoline. The compounds are prepared in known manner, e. g., by reaction of acetone with the appropriate 4-alkoxy or 4-alkylaniline.

Herbicidal compositions containing the present quinoline derivatives are readily obtained by first preparing a solution of the quinoline compound in an organic solvent and then adding the resulting solution to water containing an emulsifying agent to form an emulsion. Because of the very high herbicidal efficiency of the present quinoline derivatives they may be present in the herbicidal composition in only very small concentrations, for example, in concentrations of from 1.0 per cent to 2 per cent by weight of the total weight of the emulsion. Emulsifying agents which may be employed are those customarily used in the art for the preparation of oil-in-water emulsions. The word "oil" is here used to designate any liquid which is insoluble in water. Since the present quinoline compounds are highly stable compositions of little chemical reactivity, they are not affected by either ionic or non-ionic emulsifying agents. Examples of emulsifying agents which may be used include alkylbenzenesulfonates, long-chained polyalkylene glycols, long-chained succinates, etc. The emulsions may be used to destroy already existing plant growth by direct application to the undesirable plants, e. g., by spraying; or the emulsions may be employed to prevent plant growth by application to media which normally support plant growth. When employed to prevent plant growth, for example, in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However, the emulsions may be incorporated into customarily employed temporary surfacing materials, e. g., oils, cinders, etc.

The present invention is further illustrated, but not limited, by the following example:

Example

Spray testing of the present herbicidal compositions was conducted as follows:

Cyclohexanone solutions of the quinoline compounds shown below were respectively added to water together with an emulsifying agent, the quantity of solution employed being calculated to give respective emulsions containing 1.0 per cent and 0.3 per cent of the quinoline compound based on the weight of each emulsion. The quantity of emulsifying agent used was 0.2 per cent by weight, based on the weight of each emulsion. The empulsifying agent comprised a mixture of a polyalkyleneglycol and an alkylbenzenesulfonate.

Three week old corn and bean plants, respectively, were sprayed with the emulsions, 2 plants of each variety being employed. The spraying was continued until droplets formed upon and/or fell from the foliage and stems of the sprayed plants up to 15 ml. of the emulsions being applied to each plant. The sprayed plants as well as two untreated specimens of each plant were allowed then to remain under standard conditions of sunlight and watering for a period of one week. At the end of that time the sprayed plants were compared with the untreated plants in order to determine the extent of injury, if any. The following observations were made:

| 6-R-2,2,4-trimethyl-1,2-dihydroquinoline | Extent[1] of injury | |
|---|---|---|
| | Bean | Corn |
| R=ethoxy: | | |
| 1.0% | 3 | 4, 4a |
| 0.3% | 2 | 3 |
| R=methoxy: | | |
| 1.0% | 2 | 4, 4a |
| 0.3% | 1 | 3 |
| R=butoxy: | | |
| 1.0% | 2 | 4, 4a |
| 0.3% | 1 | 2 |
| R=n-butyl: | | |
| 1.0% | 1 | 4, 4a |
| 0.3% | 0 | 3 |
| R=sec-butyl: | | |
| 1.0% | 2 | 4, 4a |
| 0.3% | 0 | 2 |
| R=isopropyl: | | |
| 1.0% | 2 | 4, 4a |
| 0.3% | 1 | 2 |
| R=methyl: | | |
| 1.0% | 2 | 4, 4a |
| 0.3% | 1 | 2 |

[1] 1=moderate; 2=slight; 3=severe; 4=leaves dried; 4a=plant dead; 0=no injury.

As may be seen from the above data the present 6-alkyl or 6-alkoxy-2,2,4-trimethyl-1,2-dihydroquinolines demonstrate selective activity, i. e., they show a marked effect against corn, a narrow leaf plant, and possess little, if any, activity against bean, a broad leaf plant.

While the present quinoline compounds are most advantageously employed as herbicides by incorporating them into an aqueous emulsion as herein described, they may also be employed in other plant destroying methods. Thus they may be incorporated into solid carriers such as clay, talc, pumice and bentonite to give herbicidal compositions which may be applied to the plants or to surfaces which are to be freed from plant growth. The present quinoline derivatives may also be mixed with liquid or solid agricultural pesticides, e. g., insecticides and fungicides. While solutions of the quinoline compounds in organic solvents may be employed for preventing and destroying plant growth, we have found that the emulsions possess an improved tendency to adhere to the treated surfaces and that less of the active ingredient, i. e., the quinoline compounds, is required to give comparable herbicidal efficiency.

What we claim is:

1. A herbicidal composition comprising an oil-in-water emulsion of a quinoline derivative having the formula

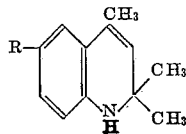

in which R is selected from the class consisting of alkyl and alkoxy radicals of from 1 to 5 carbon atoms, said quinoline derivative being present in said emulsion in a quantity which is toxic to plant life.

2. A herbicidal composition comprising an oil-in-water emulsion containing 6-butyl-1,2-dihydro-2,2,4-trimethylquinoline in a quantity which is toxic to plant life.

3. A herbicidal composition comprising an oil-in-water emulsion containing 6-sec-butyl-1,2-dihydro-2,2,4-trimethylquinoline in a quantity which is toxic to plant life.

4. A herbicidal composition comprising an oil-in-water emulsion containing 6-ethoxy-1,2-dihydro-2,2,4-trimethylquinoline in a quantity which is toxic to plant life.

5. A herbicidal composition comprising an oil-in-water emulsion containing 6-methoxy-1,2-dihydro-2,2,4-trimethylquinoline in a quantity which is toxic to plant life.

6. A herbicidal composition comprising an oil-in-water emulsion containing 1,2-dihydro-2,2,4,6-tetramethylquinoline in a quantity which is toxic to plant life.

7. The method of destroying undesirable plants which comprises applying to said plants a toxic quantity of a herbicidal composition comprising a quinoline derivative having the formula

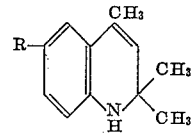

in which R is selected from the class consisting of alkyl and alkoxy radicals of from 1 to 5 carbon atoms, said quinoline derivative being present in said composition in a quantity which is toxic to plant life.

8. The method of destroying undesirable plants which comprises applying to said plants a toxic quantity of a herbicidal composition comprising an oil-in-water emulsion of a quinoline compound having the formula

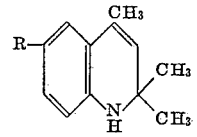

in which R is selected from the class consisting of alkyl and alkoxy radicals of from 1 to 5 carbon atoms, said quinoline compound being present in said emulsion in a quantity which is toxic to plant life.

9. The method of destroying undesirable plants which comprises applying to said plants a toxic quantity of an oil-in-water emulsion of 6-butyl-1,2-dihydro-2,2,4-trimethylquinoline.

10. The method of destroying undesirable plants which comprises applying to said plants a toxic quantity of an oil-in-water emulsion of 6-sec-butyl-1,2-dihydro-2,2,4-trimethylquinoline.

11. The method of destroying undesirable plants which comprises applying to said plants a toxic quantity of an oil-in-water emulsion of 6-ethoxy-1,2-dihydro-2,2,4-trimethylquinoline.

12. The method of destroying undesirable plants which comprises applying to said plants a toxic quantity of an oil-in-water emulsion of 6-methoxy-1,2-dihydro-2,2,4-trimethylquinoline.

13. The method of destroying undesirable plants which comprises applying to said plants a toxic quantity of an oil-in-water emulsion of 1,2-dihydro-2,2,4,6-tetramethylquinoline.

DAVID T. MOWRY.
ARTHUR H. SCHLESINGER.

No references cited.